US006743287B2

(12) United States Patent
Sunde

(10) Patent No.: US 6,743,287 B2
(45) Date of Patent: Jun. 1, 2004

(54) CONCRETE

(75) Inventor: Lasse Sunde, Oslo (NO)

(73) Assignee: Norsk Glassgjenvinning AS, Oslo (NO)

( * ) Notice: Subject to any disclaimer, the term of this patent is extended or adjusted under 35 U.S.C. 154(b) by 0 days.

(21) Appl. No.: 10/169,096

(22) PCT Filed: Feb. 7, 2001

(86) PCT No.: PCT/NO01/00043

§ 371 (c)(1),
(2), (4) Date: Aug. 1, 2002

(87) PCT Pub. No.: WO01/58822

PCT Pub. Date: Aug. 16, 2001

(65) Prior Publication Data

US 2003/0037707 A1 Feb. 27, 2003

(30) Foreign Application Priority Data

Feb. 8, 2000 (NO) .............................................. 000612

(51) Int. Cl.$^7$ ........................ C04B 18/18; C04B 18/30
(52) U.S. Cl. ....................... 106/697; 106/705; 106/713; 106/716; 106/814; 106/816
(58) Field of Search .................... 106/697, 705, 106/713, 716, 814, 816

(56) References Cited

U.S. PATENT DOCUMENTS

| 5,803,960 A | 9/1998 | Baxter |
| 5,810,921 A | 9/1998 | Baxter et al. |
| 5,849,075 A | * 12/1998 | Hopkins et al. ............ 106/705 |

FOREIGN PATENT DOCUMENTS

| WO | 94/19294 | 9/1994 |

* cited by examiner

Primary Examiner—Elizabeth D. Wood
(74) Attorney, Agent, or Firm—Dennison, Schultz, Dougherty & MacDonald

(57) ABSTRACT

A concrete in which the aggregate of sand and stones in at least partially replaced by crushed glass. The sand fraction may be replaced by a glass of grain size 0–5 mm, a non-alkali reactive mineral with grain size 0–5 mm or a combination thereof. The stone fraction may be replaced by glass of grain size 5–20 mm. The concrete further may further comprise silica dust, fly ash or crushed slag.

3 Claims, No Drawings

CONCRETE

FIELD OF THE INVENTION

The present invention relates to a glass concrete, i.e. a concrete in which the aggregates wholly or partially consist of crushed glass, providing a particularly decorative appearance, which is desirable for facades etc.

DESCRIPTION OF RELATED ART

The main elements of a concrete are cement, water, sand and stone. At production the sand and stone materials are divided in several fractions with respect to grain size. In addition it is common to add chemical and mineral components to obtain the required properties for the fresh and cured concrete.

"Glass concrete" is known per se, and has been used for certain purposes where the aesthetical aspects have been a main consideration. The use of concrete with glass as aggregate is not however, free of problems, and it has not been possible to obtain a concrete that is nearly as good as concrete with conventional aggregates with respect to compressive strength and fracture strength. Neither does the present invention give directions of a glass concrete that is particularly well suited for constructional use.

A particular problem associated with glass in concrete is the presence of alkalies in the concrete and the thereby related problems. Since glass is alkali reactive and reacts with water soluble alkalies in the concrete, expansion will usually occur, causing fissures in the concrete. The problem is well known and attempts have been made to avoid it by using low alkali cement and different additives, but so far no successful solution has been found.

Swedish patent No. 501 419 teaches the use of recycle glass as a filler in concrete. With filler in this context is meant a (glass) fraction with grain sizes from 0–0.25 mm. The characterizing part of the patent is that 95% by weight of the glass filler used has a grain size less than 300 micrometer (0.3 mm). It is an object of the method according to this patent to provide a concrete that has good compressive strength and good properties with respect to workability of the fresh concrete. By using a filler with very fine grains it is possible to reduce the water content, which generally gives a better compressive strength for the finished, cured concrete. As shall be further elaborated below, however, the choice of grain size according to this patent implies a potential risk of alkali reactivity in the cured concrete, especially in cases where the concrete also includes alkali reactive aggregates.

For the manufacture of alkali resistant concrete, it is important that the total content of alkali is as low as possible. It is thus common to use low alkali cement with equivalent $Na_2O \leq 0.6\%$. In addition possible alkali content in the aggregates or additives must be taken into consideration.

SUMMARY OF THE INVENTION

The object of the present invention is to provide a product that is environmentally friendly and friendly with respect to the utilization of resources, by utilizing recycle glass as an aggregate to concrete for aesthetical purposes. More particularly it is an object to provide a glass concrete with best possible properties with respect to compressive strength and fracture strength. More particularly it is an object of the invention to eliminate the probably most severe disadvantage of glass concrete, namely the tendency of fissuration as a consequence of alkali reactions.

DETAILED DESCRIPTION OF THE INVENTION

These objects are achieved by means of a concrete comprising water and cement in which the aggregate of sand and stones wholly or partially is substituted by crushed glass, whereby the substantial amount of the sand fraction is substituted either by a glass fraction with a grain size 0–5 mm, by a non alkali reactive mineral with said grain size or by a combination of said two fractions, whereas the substantial amount of the stone fraction is substituted by a glass fraction with grain size 5–20 mm, while the concrete additionally comprises silica dust, flyash or finely crushed slag if the finest fraction of glass (0–5 mm) is present in significant amounts in the concrete.

What has not really been given attention earlier, and for the first time is taken into consideration with the present invention, is that the glass itself is an alkali source. This is illustrated through laboratory tests as referred below.

The laboratory tests were conducted the following way. Glass was crushed to different grain sizes, extracted in a saturated solution of calcium hydroxide at 50° C. for up to 20 weeks. After predetermined exposure times, samples were taken from each grain fraction and analysed with respect to sodium and potassium. Total amount of released alkali as a function of grain size is shown below as g $Na_2O$ equiv./100 g glass.

TABLE 1

Extraction of alkali from glass.

| Fraction (mm) | $Na_2O$/100 g | Fraction (mm) | $Na_2O$/100 g glass |
| --- | --- | --- | --- |
| 0–0.075 | 0.915 | 0.500–1.00 | 0.343 |
| 0.075–0.125 | 0.870 | 1.00–2.00 | 0.229 |
| 0.125–0.250 | 0.826 | 2.00–10.00 | 0.096 |
| 0.250–0.500 | 0.633 | 10.00–20.00 | 0.041 |

The results of table 1 indicates that releasable alkalies from glass may contribute significantly to the alkali of the concrete. It further shows that the amount extractable alkali per weight unit glass, increases with decreasing grain size. This observation forms part of the basis for the present invention.

Tests were conducted with respect to alkali reactions according to Canadian Standard CSA A 23.2-14A. According to this method concrete prisms (10×10×45 cm) are exposed at 38° C. og 100% RH for up to one year. If the expansion of the prisms during the test period exceeds 0.04%, the concrete is considered to be potentially alkali reactive.

8 samples of concrete mixtures with recycle glass were tested for manufacture of glass concrete according to the invention. The mixture diagram and results of compressive strength in MPa after 28 days are shown in table 2. In the test program 3 types of cement were involved: Standard Portland cement (P30), HS65 from Norcem and White cement from Ålborg Portland, Denmark. The two latter cement types are low alkali cements. To investigate the glass reactivity, one of the mixtures was added extra alkali in addition to the amount naturally occurring (mixture No. 6). The effect of the silica dust on the expansion (alkali reaction) was investigated with mixtures No. 5 and No. 7. Both these mixtures were based on low alkali cements. In mixture No. 4 glass with grain size 0–5 mm was substituted by a non alkali reactive mineral, granite. To investigate whether finely crushed glass exhibits pozzolane properties and thereby the same desirable effect on the alkali reactivity of the glass concrete as the silica dust, mixture No. 8 was added 74 kg glass powder/m³ concrete.

alkali from the glass that causes a high alkali concentration in the concrete mixtures, cf table 1.

TABLE 2

The composition of the test mixtures (in kg/m3 concrete) and the results from tests of fresh properties and compressive strength

| Mixture No. | | 1 | 2 | 3 | 4 | 5 | 6 | 7 | 8 |
|---|---|---|---|---|---|---|---|---|---|
| Na2 equiv (of cement + addition) | | 3.1 | 1.91 | 0.75 | 0.81 | 0.67 | 4.92 | 1.8 | 1.88 |
| Cement | P30 | 365 | | | | | 366 | | |
| | HS65 | | 374 | | | | | 352 | 368 |
| | White | | | 357 | 384 | 317 | | | |
| Silica | | | | | | | 35 | 35 | |
| Årdal sand | | | | | 769 | | | | |
| Glass powder | | | | | | | | | 74 |
| Glass 0–5 mm | | 731 | 748 | 714 | | 704 | 732 | 662 | 662 |
| Glass 5–20 mm | | 892 | 913 | 871 | 939 | 860 | 895 | 862 | 902 |
| Defoamer | | 0.9 | 0.9 | 0.9 | 1 | 0.9 | 0.9 | 0.9 | 0.9 |
| Na(OH)₂ | | | | | | | 2.46 | | |
| Water (tot) | | 210 | 194 | 223 | 202 | 233 | 211 | 247 | 223 |
| water/(cement + silica) | | 0.58 | 0.56 | 0.63 | 0.53 | 0.66 | 0.58 | 0.64 | 0.61 |
| Sink, cm | | 4 | 7 | 12 | 9 | 5 | 4 | 7 | 8 |
| Density | | 2200 | 2245 | 2165 | 2295 | 2150 | 2210 | 2165 | 2230 |
| Air, % | | 3.4 | 1.7 | 3.6 | 1.7 | 3.4 | 2.8 | 2.2 | 1.2 |
| Compressive strength (MPa), 28 days | | 32.7 | 39.7 | 34.1 | 50.5 | 37.6 | 25.5 | 43.3 | 36.2 |

The results of 52 weeks aging at 38° C., 100% RH is shown in table 3 as % expansion (in length direction) of the original prism lengths (a "−" ahead the length change indicates a negative change, i.e. shrinking).

TABLE 3

Length changes of glass concrete in %

| Time (weeks) | Mix. 1 | Mix. 2 | Mix. 3 | Mix. 4 | Mix. 5 | Mix. 6 | Mix. 7 | Mix. 8 |
|---|---|---|---|---|---|---|---|---|
| 1 | 0.01 | 0 | 0.01 | 0 | 0 | 0.01 | 0 | 0 |
| 2 | 0.015 | 0 | 0.01 | 0 | 0 | 0.019 | −0.01 | 0 |
| 4 | 0.037 | 0.01 | 0.01 | 0 | 0 | 0.041 | 0 | 0 |
| 8 | 0.13 | 0.058 | 0.01 | 0 | 0 | 0.139 | 0 | 0.024 |
| 12 | 0.228 | 0.157 | 0.028 | 0 | 0 | 0.261 | 0 | 0.09 |
| 16 | 0.36 | 0.294 | 0.091 | 0 | 0 | 0.396 | 0 | 0.181 |
| 26 | 0.699 | 0.67 | 0.447 | 0 | 0 | 0.764 | 0 | 0.488 |
| 52 | 1.505 | 1.515 | 1.494 | 0 | 0 | 1.663 | 0 | 1.206 |

The results show that after 16 weeks or more only three glass concrete mixtures (No-4, 5 and 7) satisfy the requirements to alkali reactivity according to CSA-A23.2-14A, i.e. that the expansion is less than 0.04%. These three glass concrete mixtures are based on low alkali cement with silica dust (mixture No. 5 and 7), alternatively a fine fraction (grain size 0–5 mm) substituted by a non alkali reactive granite (mixture No. 4). Normally use of low alkali cement will prevent expansion in a concrete produced with sand and stones respectively comprising alkali reactive components, but these tests show that low alkali cement alone is not sufficient to prevent expansion of the glass concrete (mixtures 2 and 3). A comparison of the results for mixture No. 8 and with mixture No. 7 shows that glass dust does not have the same favourable effect as silica dust regarding prevention of expansion of glass concrete.

The results indicate that the production of alkali resistant glass concrete with crushed glass as the fine fraction, is conditional on the addition of silica dust or the like. Flyash or finely crushed slag may be used as alternatives to silica dust. It is reason to believe that the unfavourable effect of crushed glass as a fine fraction is due to an extraction of alkali from the glass that causes a high alkali concentration in the concrete mixtures, cf table 1.

As alkali extraction increases with decreasing grain size of the glass fraction, it may be beneficial to avoid completely glass with grain size less than 0.5 mm, at least for purposes where there are particular requirements to compressive strength and long time durability. If for some reasons such a fraction is wanted in the concrete, it should also be added a pozzolan (silica dust or the like), alternatively finely crushed material of non alkali reactive minerals.

What is claimed is:

1. A concrete comprising water, cement, fine aggregate and coarse aggregate, the fine aggregate comprising sand and a component selected from the group consisting of crushed glass of a grain size less than 5 mm, a non-alkali reactive mineral with a grain size less than 5 mm and a mixture thereof, and the coarse aggregate comprising stones and crushed glass of a grain size 5–20 mm, said concrete further comprising silica dust, fly ash or crushed slag.

2. The concrete according to claim 1, wherein the fine aggregate comprises crushed glass of a grain size of at least 0.5 mm.

3. The concrete according to claim 2, further comprising a finest aggregate of grain size less than 0.5 mm selected from the group consisting of a pozzolane material and finely crushed non-alkali reactive mineral.

* * * * *